United States Patent
Wang et al.

(10) Patent No.: US 10,341,682 B2
(45) Date of Patent: Jul. 2, 2019

(54) METHODS AND DEVICES FOR PANORAMIC VIDEO CODING AND DECODING BASED ON MULTI-MODE BOUNDARY FILL

(71) Applicant: Peking University Shenzhen Graduate School, Shenzhen (CN)

(72) Inventors: Zhenyu Wang, Shenzhen (CN); Ronggang Wang, Shenzhen (CN); Xiubao Jiang, Shenzhen (CN); Wen Gao, Shenzhen (CN)

(73) Assignee: Peking University Shenzhen Graduate School, Shenzhen (CN)

( * ) Notice: Subject to any disclaimer, the term of this patent is extended or adjusted under 35 U.S.C. 154(b) by 0 days.

(21) Appl. No.: 15/747,864

(22) PCT Filed: Jan. 19, 2016

(86) PCT No.: PCT/CN2016/071383
§ 371 (c)(1),
(2) Date: Jan. 26, 2018

(87) PCT Pub. No.: WO2017/124305
PCT Pub. Date: Jul. 27, 2017

(65) Prior Publication Data
US 2019/0007702 A1 Jan. 3, 2019

(51) Int. Cl.
*H04N 19/563* (2014.01)
*H04N 19/597* (2014.01)
(Continued)

(52) U.S. Cl.
CPC ......... *H04N 19/597* (2014.11); *H04N 19/176* (2014.11); *H04N 19/51* (2014.11);
(Continued)

(58) Field of Classification Search
CPC .. H04N 19/597; H04N 19/176; H04N 19/563; H04N 19/51; H04N 19/55; H04N 19/61
See application file for complete search history.

(56) References Cited

U.S. PATENT DOCUMENTS

| | | | |
|---|---|---|---|
| 2006/0034529 A1* | 2/2006 | Park | H04N 19/563 382/236 |
| 2006/0034530 A1* | 2/2006 | Park | G06T 9/004 382/236 |

(Continued)

*Primary Examiner* — Robert J Hance
(74) *Attorney, Agent, or Firm* — SV Patent Service

(57) ABSTRACT

Methods and devices are disclosed for panoramic video coding and decoding based on multi-mode boundary fill. If a predicted image block of a current image block is obtained by inter-frame prediction. The inter-frame prediction includes a boundary fill step of adaptively selecting a boundary fill method according to coordinates of a reference sample when the reference sample of a pixel in the current image block is outside the boundary of a corresponding reference image, to obtain a sample value of the reference sample. The panoramic video encoding and decoding method and device based on multi-mode boundary fill in the present invention make full use of the characteristic that horizontal image contents in a panoramic video are cyclically connected to optimize an image boundary fill method, such that the encoding can adaptively select a more reasonable boundary fill method according to the coordinates of a reference sample, thereby improving compression efficiency.

6 Claims, 5 Drawing Sheets

(51) Int. Cl.
*H04N 19/51* (2014.01)
*H04N 19/61* (2014.01)
*H04N 19/55* (2014.01)
*H04N 19/176* (2014.01)

(52) U.S. Cl.
CPC .......... *H04N 19/55* (2014.11); *H04N 19/563* (2014.11); *H04N 19/61* (2014.11)

(56) References Cited

U.S. PATENT DOCUMENTS

| | | | |
|---|---|---|---|
| 2009/0060359 A1* | 3/2009 | Kim | H04N 19/563 382/236 |
| 2010/0020879 A1* | 1/2010 | Pasquier | H04N 19/563 375/240.16 |
| 2011/0122950 A1* | 5/2011 | Ji | H04N 19/563 375/240.16 |
| 2012/0082216 A1* | 4/2012 | Wang | H04N 19/70 375/240.08 |
| 2012/0320970 A1* | 12/2012 | Drugeon | H04N 19/563 375/240.02 |
| 2013/0083853 A1* | 4/2013 | Coban | H04N 19/563 375/240.16 |
| 2015/0071357 A1* | 3/2015 | Pang | H04N 19/563 375/240.16 |
| 2017/0085917 A1* | 3/2017 | Hannuksela | H04N 19/597 |

\* cited by examiner

METHODS AND DEVICES FOR PANORAMIC VIDEO CODING AND DECODING BASED ON MULTI-MODE BOUNDARY FILL

TECHNICAL FIELD

The present invention relates to the field of digital video encoding and decoding technology, and specifically, to methods and devices for coding and decoding panoramic videos based on multi-mode boundary fill.

BACKGROUND OF THE INVENTION

At present, the virtual reality technology and related applications are developing rapidly. In the virtual reality technology, panoramic images and panoramic videos are an important part. Panoramic video records all surrounding view pictures with a large data amount, so the panoramic video compression is a key technology in virtual reality application. As a new emerging media, compared with the traditional video, panoramic video has the characteristics of wide field of view, high resolution and a large data amount. Using panoramic videos, the observer's view does not change. Change the observation direction to observe all the surrounding scenes. Ordinary two-dimensional video reflects only a part of the panoramic video.

Cylindrical panoramic video is a common panoramic video, equivalent to a virtual camera. The three-dimensional space object is projected onto the cylinder. Cylindrical panoramic videos can be generated by using multi-camera or single-camera acquisition systems.

As the field of view of panoramic video is 5~6 times of that of the normal video, to provide users with the same visual quality, the data volume of panoramic video is 5~6 times of that of the normal video. According to the traditional video transmission scheme, the use of panoramic video in the network environment becomes more and more difficult. Block encoding and transmission have become a common solution for the transmission of panoramic video for users who need to see only part of the panoramic video at the same moment.

Referring to FIG. 1, a transmission method of the cylindrical panoramic video mainly includes the following steps:

A panoramic image is segmented and each image block sequence is encoded independently.

Then the encoded data to be used are selected for transmission. Here one can select the data based on the user's current perspective. The transmission media may be the Internet, wireless networks, local area networks, optical networks, other suitable transmission media, or suitable combinations of these transmission media.

Finally, after the decoder receives the data, these block sequences are independently decoded and transformed to get the desired image.

In the block encoding of panoramic video, the size of the block has important impact on the encoding efficiency of panoramic video and the transmission area. These two factors directly determine the data amount to be transmitted. If the encoding block is small, the transmission area is small, but the encoding efficiency is low. If the encoding block is large, the encoding efficiency is high, but the transmission area is also large. Therefore, for the same visual quality, the data amount to be transmitted for different encoding block sizes is not the same.

For special characteristics of panoramic videos compared with normal videos, such as circular panoramic videos and high distortion of pictures, a special encoding technology is needed to improve the compression efficiency of the panoramic video. Improving the compression efficiency of panoramic videos is a problem long studied in the field.

SUMMARY OF THE INVENTION

The present invention provides methods and devices for panoramic video encoding and decoding based on multi-mode boundary fill to improve the compression efficiency of panoramic videos.

According to an aspect of the present invention, the invention provides a panoramic video encoding method based on multi-mode boundary fill, comprising the steps of:

dividing the current image into a plurality of image blocks;

obtaining a predicted image block of a current image block by means of inter-frame prediction; the inter-frame prediction comprises a boundary fill step of adaptively selecting a boundary fill method according to coordinates of the reference sample when the reference sample of a pixel in the current image block is outside the boundary of a corresponding reference image, so as to obtain a sample value of the reference sample;

subtracting the current image block from the predicted image block to obtain a residual block;

subtracting the current image block from the predicted image block to obtain a residual block; and transforming, quantizing and entropy encoding the residual block to obtain an encoded stream; and the boundary fill method selected in the boundary fill step is written in a sequence header or an image header of the encoded stream.

In some aspects, adaptively selecting a boundary fill method can include: obtaining a sample value of the reference sample by using the horizontal image boundary fill method when the vertical ordinate of the reference sample is between the upper boundary and the lower boundary of the reference image and the horizontal ordinate of the reference sample is outside the left boundary and the right boundary of the reference image; and obtaining the sample value of the reference sample by using the vertical image boundary fill method when the vertical ordinate of the reference sample is outside the upper boundary and the lower boundary of the reference image.

According to one embodiment, a cyclic fill method can be used for the horizontal image boundary fill method when the vertical ordinate of the reference sample is between the upper boundary and the lower boundary of the reference image and the horizontal ordinate of the reference sample is outside the left boundary and the right boundary of the reference image. A cyclic fill method can be used for the vertical image boundary fill method when the vertical ordinate of the reference sample is outside the upper boundary and the lower boundary of the reference image.

According to another embodiment, a cyclic fill method can be used for the horizontal image boundary fill method when the vertical ordinate of the reference sample is between the upper boundary and the lower boundary of the reference image and the horizontal ordinate of the reference sample is outside the left boundary and the right boundary of the reference image. A repeated fill method is used for the vertical image boundary fill method when the vertical ordinate of the reference sample is outside the upper boundary and the lower boundary of the reference image.

According to a further aspect of the present invention, the invention further provides a panoramic video encoding device based on multi-mode boundary fill. The panoramic video encoding device includes:

an image block dividing module configured to divide the current image into a plurality of image blocks;

an inter-frame prediction module configured to obtain a predicted image block of a current image block by means of inter-frame prediction, wherein the inter-frame prediction module includes a boundary fill unit configured to adaptively select a boundary fill method according to coordinates of the reference sample when the reference sample of a pixel in the current image block is outside the boundary of a corresponding reference image, to obtain a sample value of the reference sample;

a calculation module configured to subtract the current image block from the predicted image block to obtain a residual block; and a stream generating module configured to transform, quantize and entropy encode the residual block to obtain an encoded stream, wherein a boundary fill method selected by the boundary fill unit is written in a sequence header or an image header of the encoded stream.

In some aspects, the boundary fill unit can adaptively select a boundary fill method according to coordinates of the reference sample when the reference sample of a pixel in the current image block is outside the boundary of a corresponding reference image, to obtain a sample value of the reference sample. A boundary fill unit can obtain the sample value of the reference sample by using the horizontal image boundary fill method when the vertical ordinate of the reference sample is between the upper boundary and the lower boundary of the reference image and the horizontal ordinate of the reference sample is outside the left boundary and the right boundary of the reference image. The boundary fill unit can obtain the sample value of the reference sample by using the vertical image boundary fill method when the vertical ordinate of the reference sample is outside the upper boundary and the lower boundary of the reference image.

According to one embodiment, the boundary fill unit can use a cyclic fill method as the horizontal image boundary fill method when the vertical ordinate of the reference sample is between the upper boundary and the lower boundary of the reference image and the horizontal ordinate of the reference sample is outside the left boundary and the right boundary of the reference image. The boundary fill unit can use a cyclic fill method the vertical image boundary fill method when the vertical ordinate of the reference sample is outside the upper boundary and the lower boundary of the reference image.

According to another embodiment, the boundary fill unit can use a cyclic fill method as the horizontal image boundary fill method when the vertical ordinate of the reference sample is between the upper boundary and the lower boundary of the reference image and the horizontal ordinate of the reference sample is outside the left boundary and the right boundary of the reference image. The boundary fill unit can use a repeated fill method as the vertical image boundary fill method when the vertical ordinate of the reference sample is outside the upper boundary and the lower boundary of the reference image.

According to the third aspect of the present invention, the invention further provides a panoramic video decoding method based on multi-mode boundary fill that includes:

entropy decoding, inverse quantizing, and inverse transforming the encoded stream to obtain a reconstructed residual block;

obtaining a predicted image block of a current image block by means of inter-frame prediction; the inter-frame prediction comprises a boundary fill step of using a boundary fill method recorded in a sequence header or an image header of the encoded stream to obtain a sample value of the reference sample; and adding the predicted image block to the reconstructed residual block to obtain a reconstructed image block.

According to one embodiment, the recorded boundary fill method can be adopted as the image of all sequences in the encoded stream when the boundary fill method is recorded in the sequence header of the encoded stream. The recorded boundary fill method can be adopted for the image corresponding to the image header when the boundary fill method is recorded in the image header of the encoded stream.

According to the fourth aspect of the present invention, the invention further provides a panoramic video decoding device based on multi-mode boundary fill, comprising:

a residual block reconstruction module configured to entropy decode, inverse quantize, and inverse transform the encoded stream to obtain a reconstructed residual block;

an inter-frame prediction module configured to obtain a predicted image block of a current image block by means of inter-frame prediction; the inter-frame prediction module comprises a boundary fill unit configured for using a boundary fill method recorded in a sequence header or an image header of the encoded stream to obtain a sample value of the reference sample; and an image block reconstruction module configured to add the predicted image block to the reconstructed residual block to obtain a reconstructed image block.

According to one embodiment, the boundary fill unit can adopt the recorded boundary fill method for the image of all sequences in the encoded stream when the boundary fill method is recorded in the sequence header of the encoded stream. The boundary fill unit can adopt the recorded boundary fill method for the image corresponding to the image header when the boundary fill method is recorded in the image header of the encoded stream.

The panoramic video encoding and decoding method and device based on multi-mode boundary fill provided in the present invention make full use of the characteristic that horizontal image contents in a panoramic video are cyclically connected to optimize an image boundary fill method, such that an encoding end can adaptively select a more reasonable boundary fill method according to the coordinates of a reference sample, thereby improving compression efficiency.

DETAILED DESCRIPTION OF THE INVENTION

The inventive idea of the present invention is that in the traditional video encoding and decoding standard the repeated fill method is uniformly used for the image boundary. For sample points outside the image boundary, the value of a point on the image boundary, which is closest to the sample point is used as the sample value of a sample point. So we make full use of the characteristic that horizontal image contents in a panoramic video are cyclically connected to optimize an image boundary fill method, thereby improving compression efficiency. In a method and a device for panoramic video encoding and decoding based on multi-mode boundary fill provided in the present invention, encoding can adaptively select a more reasonable boundary fill method according to the coordinates of a reference sample, thereby improving compression efficiency.

The present invention will become apparent from the following detailed description of embodiments and from the accompanying drawings.

Embodiment 1

Figure 1:
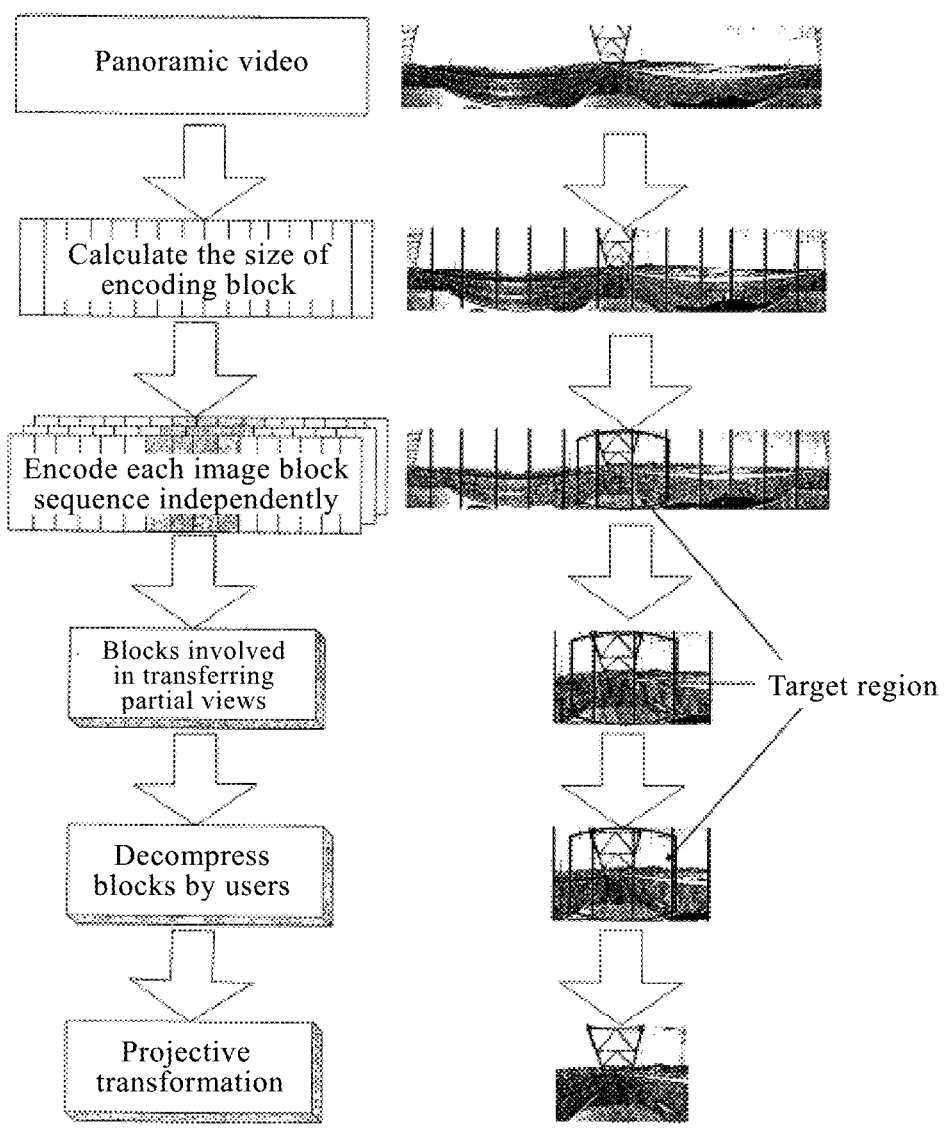
FIG. 1 is a schematic illustration of a transmission method for cylindrical panoramic video.
Figure 2:
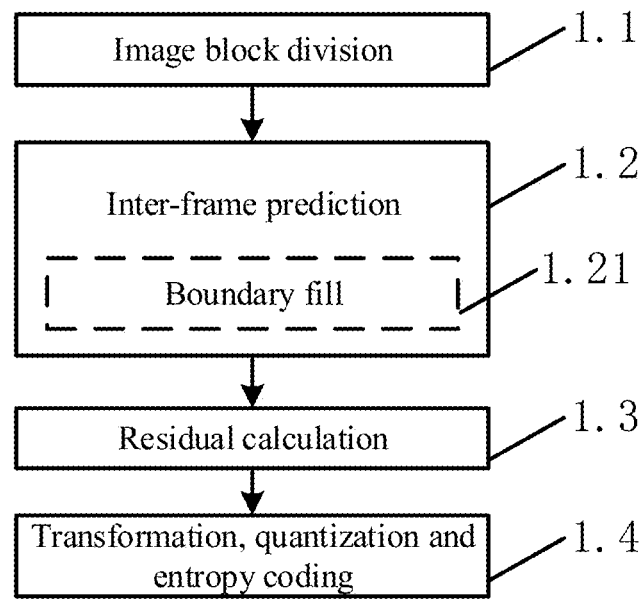
FIG. 2 is a flowchart of a panoramic video encoding method based on multi-mode boundary fill according to an embodiment in the present invention.

Referring to FIG. 2, this embodiment provides a panoramic video encoding method based on multi-mode boundary fill, which includes the steps of:

Step 1.1: dividing the current image into a plurality of image blocks. Specifically, the size of the segmented image blocks can be selected according to the actual needs.

Step 1.2: obtaining predicted image block by inter-frame prediction. In this embodiment, Step 1.2 comprises a boundary fill step (Step 1.21), wherein Step 1.21 comprises the step of: adaptively selecting a boundary fill method according to coordinates of the reference sample when the reference sample of a pixel in the current image block is outside the boundary of a corresponding reference image, so as to obtain a sample value of the reference sample.

Figure 3:
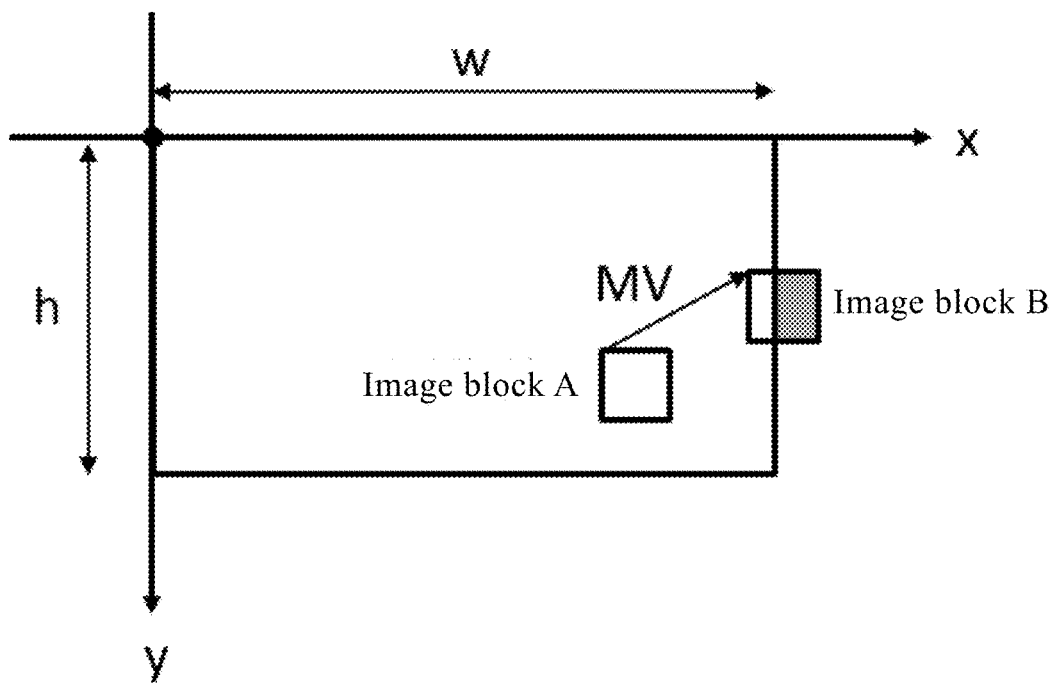
FIG. 3 is a schematic view of boundary fill during inter-frame prediction according to an embodiment in the present invention.

First of all, it should be noted that when inter-frame prediction is performed during encoding and decoding, the coordinate of the current image block is added by the motion vector MV, and the new coordinate obtained is the coordinate of the predicted image block on the reference image. Inter-frame prediction refers to extracting the value of the predicted image block on the reference image according to the coordinates as the predicted value of the current image block. When it is specific to a certain pixel in the image block, a pixel at the corresponding position in the predicted image block is referred to as a reference sample of the pixel in the current image block. However, the predicted image block on the reference image may be located partially or entirely outside the reference image boundary. Referring to FIG. 3, the current image block is the image block A and the motion vector is MV. Therefore, the predicted image block on the reference image is the image block B. Part of the image block B is outside the boundary of the reference image, so the pixel value of this part needs to be calculated by the boundary fill.

In this embodiment, obtain the sample value of the reference sample by using the horizontal image boundary fill method when the vertical ordinate of the reference sample is between the upper boundary and the lower boundary of the reference image and the horizontal ordinate of the reference sample is outside the left boundary and the right boundary of the reference image; and obtain the sample value of the reference sample by using the vertical image boundary fill method when the vertical ordinate of the reference sample is outside the upper boundary and the lower boundary of the reference image.

In this embodiment, when the vertical ordinate of the reference sample is between the upper boundary and the lower boundary of the reference image and the horizontal ordinate of the reference sample is outside the left boundary and the right boundary of the reference image, a cyclic fill method is used for the horizontal image boundary fill method; and when the vertical ordinate of the reference sample is outside the upper boundary and the lower boundary of the reference image, a repeated fill method is used for the vertical image boundary fill method.

Figure 4:
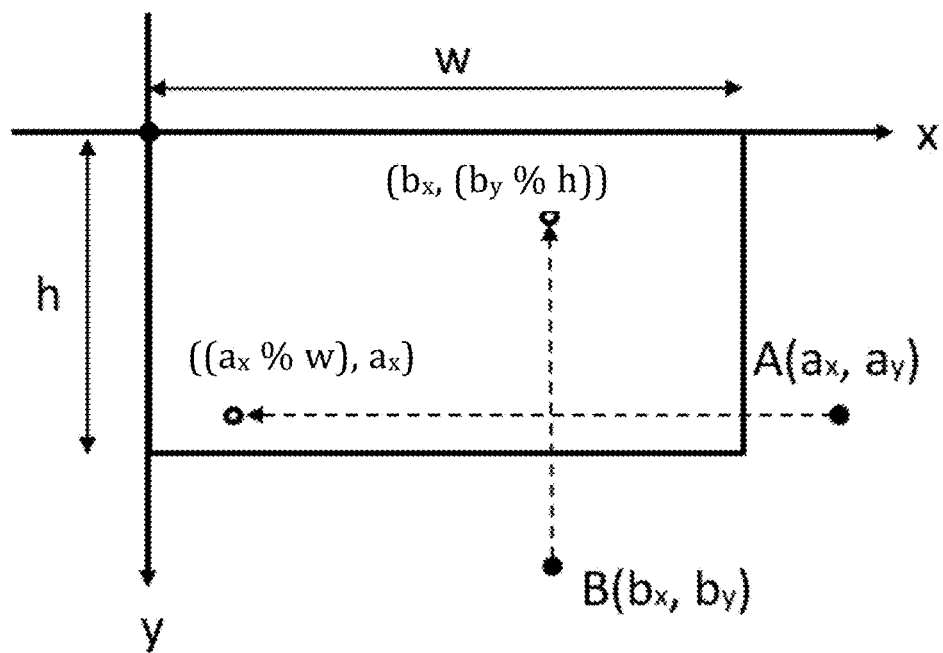
FIG. 4 is a schematic illustration of a circular fill method according to an embodiment in the present invention.

FIG. 4 illustrates a schematic view of circular fill method according to one embodiment Specifically, in this embodiment, the following method may be adopted for the circular fill method:

For an image with width w and height h, the upper left corner of the image is the origin of coordinates, the horizontal right direction is the positive x-coordinate and the vertical downward direction is the positive y-coordinate. If the coordinate of a sample point is (ax, ay), denote as sample point A. When $0 \leq ay < h$, and $ax<0$ or $ax>w-1$ (since the pixel coordinates start from 0 and the image width is w, the horizontal ordinate of the internal pixel of the image ranges from 0 to w−1), the sample value of sample point A is equal to the sample value of the sample point ((ax % w), ay). If the coordinate of a sample point is (bx, by), denote as sample point B. When $by<0$ or $by>h-1$, the sample value of sample point B is equal to the sample value of the sample point (bx, (by % h)), where the "%" operator refers to modulo operation.

According to another embodiment, when the vertical ordinate of the reference sample is between the upper boundary and the lower boundary of the reference image and the horizontal ordinate of the reference sample is outside the left boundary and the right boundary of the reference image, a cyclic fill method is used for the horizontal image boundary fill method. When the vertical ordinate of the reference sample is outside the upper boundary and the lower boundary of the reference image, a repeated fill method is used for the vertical image boundary fill method.

Figure 5:
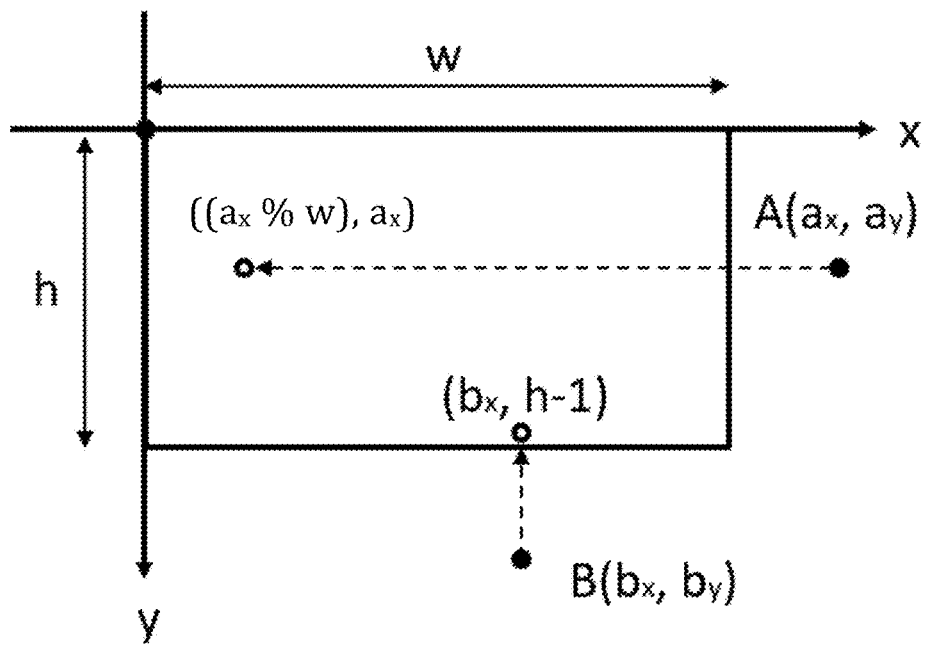
FIG. 5 is a schematic view of circular fill method and repeated fill method used respectively according to an embodiment in the present invention.

FIG. 5 illustrates a schematic view of circular fill method and repeated fill method, respectively. Specifically, the following method may be adopted for the circular fill method and the repeated fill method, respectively:

For an image with width w and height h, the upper left corner of the image is the origin of coordinates, the horizontal right direction is the positive x-coordinate and the vertical downward direction is the positive y-coordinate. If the coordinate of a sample point is (ax, ay), denote as sample point A. When $0 \leq ay < h$, and $ax<0$ or $ax>w-1$, the sample value of sample point A is equal to the sample value of the sample point ((ax % w), ay), where the "%" operator refers to modulo operation. If the coordinate of a sample point is (bx, by), denote as sample point B. When $by<0$, the sample value of sample point B is equal to the sample value of the sample point (bx, 0); and when $by>h-1$, the sample value of sample point B is equal to the sample value of the sample point (bx, h−1).

Certainly, in other embodiments, if the coordinate system changes correspondingly, for example, the coordinate origin no longer takes the upper left corner of the image, the calculation of the sample value may also be changed accordingly.

Step 1.3: subtracting the pixel in the same location of the predicted image block from each pixel of the current image block to obtain the residual block.

Step 1.4: transforming and quantizing the residual block to obtain a quantized block; and finally, writing each coefficient of the quantized block and the motion vector of the current image block into the encoded stream by entropy encoding. In this embodiment, different boundary fill methods are selected during inter-frame prediction. Therefore, the selected corresponding boundary fill method needs to be written in the encoded stream for decoding. Specifically, the selected boundary fill method in the boundary fill step is written in the sequence header or the image header of the encoded stream.

It should be noted that, specifically, whether the information about the boundary fill method is written into the sequence header or the image header is determined according to actual requirements. Writing it into the sequence header means that all images in the sequence are filled in the same way, and the image header no longer needs to write additional identifiers, thereby saving the overhead of the identification bit itself; and writing it into the image header can only mark the current image fill method. Each frame of images can be filled with different methods, and the method is flexible.

Embodiment 2

Figure 6:
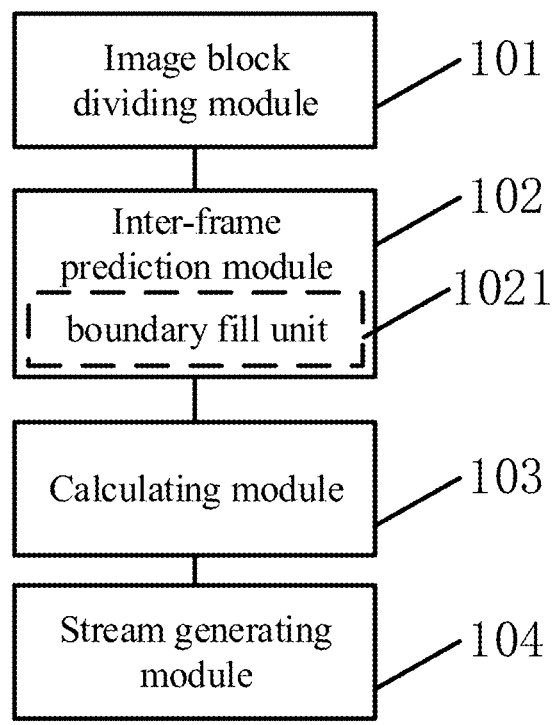
FIG. 6 is a schematic view of the module of a panoramic video encoding device based on multi-mode boundary fill according to an embodiment in the present invention

Referring to FIG. 6, corresponding to the panoramic video encoding method based on multi-mode boundary fill provided in Embodiment 1, this embodiment correspondingly provides a panoramic video encoding device based on multi-mode boundary fill, comprising an image dividing module 101, an inter-frame prediction module 102, a calculation module 103 and a stream generation module 104.

The image dividing module 101 can divide the current image into a plurality of image blocks. Specifically, the size of the segmented image blocks can be selected according to the actual needs.

The inter-frame prediction module 102 can obtain a predicted image block of a current image block by means of inter-frame prediction. In this embodiment, the inter-frame prediction module 102 includes a boundary fill unit 1021 that can adaptively selecting a boundary fill method according to coordinates of the reference sample when the reference sample of a pixel in the current image block is outside the boundary of a corresponding reference image, to obtain a sample value of the reference sample.

First of all, it should be noted that when inter-frame prediction is performed during encoding and decoding, the coordinate of the current image block is added by the motion vector MV, and the new coordinate obtained is the coordinate of the predicted image block on the reference image. Inter-frame prediction refers to extracting the value of the predicted image block on the reference image according to the coordinates as the predicted value of the current image block. When it is specific to a certain pixel in the image block, the pixel at the corresponding position in the predicted image block is referred to as a reference sample of the pixel in the current image block. However, the predicted image block on the reference image may be located partially or entirely outside the reference image boundary. Referring to FIG. 3, the current image block is the image block A and the motion vector is MV. Therefore, the predicted image block on the reference image is the image block B. Part of the image block B is outside the boundary of the reference image, so the pixel value of this part needs to be calculated by the boundary fill.

In this embodiment, the boundary fill unit 1021 can obtain the sample value of the reference sample by using the horizontal image boundary fill method when the vertical ordinate of the reference sample is between the upper boundary and the lower boundary of the reference image and the horizontal ordinate of the reference sample is outside the left boundary and the right boundary of the reference image; and obtaining the sample value of the reference sample by using the vertical image boundary fill method when the vertical ordinate of the reference sample is outside the upper boundary and the lower boundary of the reference image.

In this embodiment, the boundary fill unit 1021 can use a cyclic fill method as the horizontal image boundary fill method when the vertical ordinate of the reference sample is between the upper boundary and the lower boundary of the reference image and the horizontal ordinate of the reference sample is outside the left boundary and the right boundary of the reference image. The boundary fill unit 1021 can use a repeated fill method as the vertical image boundary fill method when the vertical ordinate of the reference sample is outside the upper boundary and the lower boundary of the reference image.

FIG. 4 illustrates a schematic view of circular fill method according to one embodiment.

Specifically, in this embodiment, the following method may be adopted for the circular fill method:

For an image with width w and height h, the upper left corner of the image is the origin of coordinates, the horizontal right direction is the positive x-coordinate and the vertical downward direction is the positive y-coordinate. If the coordinate of a sample point is (ax, ay), denote as sample point A. When 0<ay<h, and ax<0 or ax>w−1 (since the pixel coordinates start from 0 and the image width is w, the horizontal ordinate of the internal pixel of the image ranges from 0 to w−1), the sample value of sample point A is equal to the sample value of the sample point ((ax % w), ay). If the coordinate of a sample point is (bx, by), denote as sample point B. When by<0 or by>h−1, the sample value of sample point B is equal to the sample value of the sample point (bx, (by h)), where the "%" operator refers to modulo operation.

According to another embodiment, the boundary fill unit 1021 is configured for that when the vertical ordinate of the reference sample is between the upper boundary and the lower boundary of the reference image and the horizontal ordinate of the reference sample is outside the left boundary and the right boundary of the reference image, a cyclic fill method is used for the horizontal image boundary fill method. When the vertical ordinate of the reference sample is outside the upper boundary and the lower boundary of the reference image, a repeated fill method is used for the vertical image boundary fill method.

FIG. 5 illustrates a schematic view of circular fill method and repeated fill method, respectively. Specifically, the following method may be adopted for the circular fill method and the repeated fill method, respectively:

For an image with width w and height h, the upper left corner of the image is the origin of coordinates, the horizontal right direction is the positive x-coordinate and the vertical downward direction is the positive y-coordinate. If the coordinate of a sample point is (ax, ay), denote as sample point A. When 0<ay<h, and ax<0 or ax>w−1, the sample value of sample point A is equal to the sample value of the sample point (w−(ax % w), ay), where the "%" operator refers to modulo operation. If the coordinate of a sample point is (bx, by), denote as sample point B. When by<0, the sample value of sample point B is equal to the sample value of the sample point (bx, 0); and when by>h−1, the sample value of sample point B is equal to the sample value of the sample point (bx, h−1).

Certainly, in other embodiments, if the coordinate system changes correspondingly, for example, the coordinate origin no longer takes the upper left corner of the image, the calculation of the sample value may also be changed accordingly.

a calculation module 103 can subtract the current image block from the predicted image block to obtain a residual block.

a stream generation module 104 can transform, quantize, and entropy encode the residual block to obtain an encoded stream. The boundary fill method selected by the boundary fill unit 1021 is written in the sequence header or the image header of the encoded stream for decoding.

It should be noted that, specifically, whether the information about the boundary fill method is written into the sequence header or the image header is determined according to actual requirements. Writing it into the sequence header means that all images in the sequence are filled in the same way, and the image header no longer needs to write additional identifiers, thereby saving the overhead of the identification bit itself; and writing it into the image header can only mark the current image fill method. Each frame of images can be filled with different methods, and the method is flexible.

Embodiment 3

Figure 7:
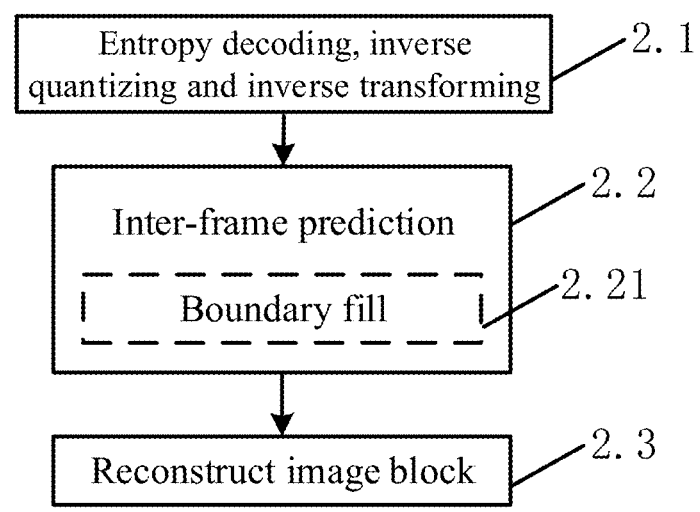
FIG. 7 is a flowchart of a panoramic video decoding method based on multi-mode boundary fill according to an embodiment in the present invention.

Referring to FIG. 7, corresponding to the panoramic video encoding method based on multi-mode boundary fill provided in Embodiment 1, this embodiment correspondingly provides a panoramic video decoding method based on multi-mode boundary fill, comprising the steps of:

Step 2.1: entropy decoding, inverse quantizing and inverse transforming the encoded stream to obtain a reconstructed residual block.

Step 2.2: obtaining predicted image block by inter-frame prediction. In this embodiment, Step 2.2 comprises a boundary fill step (Step 2.21), wherein Step 2.21 comprises the steps of: using a boundary fill method recorded in a sequence header or an image header of the encoded stream to obtain a sample value of the reference sample. Step 2.21 is the same as Step 1.21 in Embodiment 1, and is not described herein again.

In this embodiment, when the boundary fill method is recorded in the sequence header of the encoded stream, the recorded boundary fill method is adopted for the image of all sequences in the encoded stream. When the boundary fill method is recorded in the image header of the encoded stream, the recorded boundary fill method is adopted for the image corresponding to the image header.

Step 2.3: adding the predicted image block to the reconstructed residual block to obtain a reconstructed image block.

Embodiment 4

Figure 8:
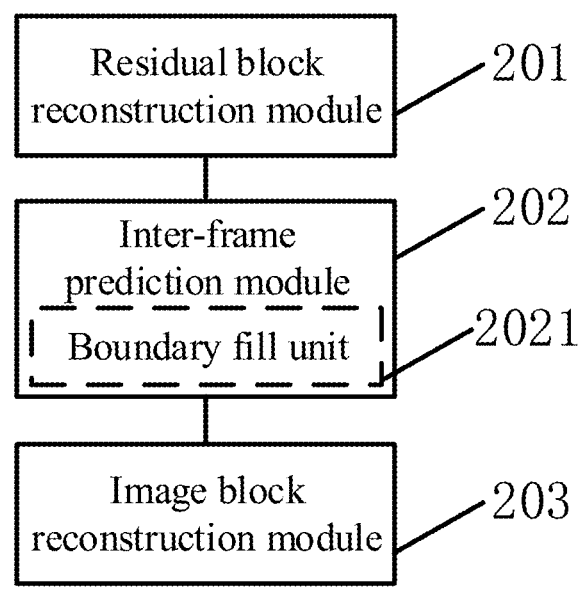
FIG. 8 is a schematic view of the module of a panoramic video decoding device based on multi-mode boundary fill according to an embodiment in the present invention.

Referring to FIG. 8, corresponding to the panoramic video decoding method based on multi-mode boundary fill provided in Embodiment 3, this embodiment correspondingly provides a panoramic video decoding device based on multi-mode boundary fill, comprising a residual block reconstruction module 201, an inter-frame prediction module 202, and an image block reconstruction module 203.

The residual block reconstruction module 201 can entropy decode, inverse quantize and inverse transform the encoded stream to obtain a reconstructed residual block.

The inter-frame prediction module 202 can for obtain a predicted image block of a current image block by means of inter-frame prediction. In this embodiment, the inter-frame prediction module 202 comprises a boundary fill unit 2021 configured to using a boundary fill method recorded in a sequence header or an image header of the encoded stream to obtain a sample value of the reference sample. The boundary fill unit 2021 is the same as the boundary fill unit 1021 in Embodiment 2, and is not described herein again.

In this embodiment, the boundary fill unit 2021 can adopt the recorded boundary fill method for the image of all sequences in the encoded stream when the boundary fill method is recorded in the sequence header of the encoded stream. The boundary fill unit 2021 can adopt the recorded boundary fill method for the image corresponding to the image header when the boundary fill method is recorded in the image header of the encoded stream.

The image block reconstruction module 203 can add the predicted image block to the reconstructed residual block to obtain a reconstructed image block.

It should be noted that, according to the embodiments of the present prevention, only the boundary fill steps in the inter-frame prediction of the panoramic video encoding and decoding is described in detail. For other steps in the panoramic video encoding and decoding process, any one of the prior art feasible methods can be adopted. In addition, generally, the video processing device may comprise an encoding device and/or a decoding device. The encoding device comprises encoding process and decoding process. The decoding device includes decoding process. The decoding process of the decoding device is the same as the decoding process of the encoding device.

It is understood by those skilled in the field that all or part of steps of various methods according to the embodiments may be programmed to instruct the associated hardware to achieve the goals, which may be stored in a readable storage medium of computer, e.g. read-only memory, random access memory, disk, or CD.

The above contents are further detailed description of the present invention in connection with the disclosed embodiments. The invention is not limited to the embodiments referred to, but may be varied and modified by those skilled in the field without departing from the concept and the scope of the present invention.

What is claimed is:

1. A method for encoding panoramic videos based on multi-mode boundary fill, comprising:
    dividing a current image into a plurality of image blocks;
    obtaining a predicted image block of a current image block using inter-frame prediction, wherein the inter-frame prediction comprises a step of boundary filling, comprising:
        when a reference sample of a pixel in the current image block is outside a boundary of a corresponding reference image, adaptively selecting a boundary fill method comprising a cyclic fill method for filling a horizontal image boundary or a vertical image boundary, according to coordinates of the reference sample to obtain a sample value of the reference sample, wherein the cyclic fill method includes:

identifying a reference sample having a first coordinate within the reference image and a second coordinate outside of the reference image, wherein the reference image has a first dimension along direction of the first coordinate and a second dimension along direction of the second coordinate; and assigning a sample value of a sample point within the reference image to the reference sample, wherein the sample point has a first coordinate the same as the reference sample and a second coordinate determined by a modulo operation of the second coordinate of the reference sample based on the second dimension of the reference image;

subtracting the current image block from the predicted image block to obtain a residual block; and transforming, quantizing, and entropy encoding the residual block to obtain an encoded stream, wherein the boundary fill method selected in the step of boundary filling is written in a sequence header or an image header of the encoded stream.

2. The method of claim 1, wherein adaptively selecting a boundary fill method according to coordinates of the reference sample comprises:

obtaining the sample value of the reference sample by using a horizontal image boundary fill method when a vertical coordinate of the reference sample is between an upper boundary and a lower boundary of the reference image and a horizontal coordinate of the reference sample is outside a left boundary or a right boundary of the reference image; and obtaining the sample value of the reference sample by using a vertical image boundary fill method when the vertical coordinate of the reference sample is outside the upper boundary and the lower boundary of the reference image.

3. The method of claim 2, wherein when the vertical coordinate of the reference sample is between the upper boundary and the lower boundary of the reference image and the horizontal coordinate of the reference sample is outside the left boundary and the right boundary of the reference image, a cyclic fill method is used for the horizontal image boundary fill method, wherein when the vertical coordinate of the reference sample is outside the upper boundary and the lower boundary of the reference image, a cyclic fill method is used for the vertical image boundary fill method.

4. The method of claim 2, wherein when the vertical coordinate of the reference sample is between the upper boundary and the lower boundary of the reference image and the horizontal coordinate of the reference sample is outside the left boundary and the right boundary of the reference image, a cyclic fill method is used for the horizontal image boundary fill method, wherein when the vertical coordinate of the reference sample is outside the upper boundary and the lower boundary of the reference image, a repeated fill method is used for the vertical image boundary fill method, wherein the repeated fill method includes:

identifying a reference sample having a first coordinate within the reference image and a second coordinate outside of the reference image, wherein the reference image has a first dimension along direction of the first coordinate and a second dimension along direction of the second coordinate; and assigning a sample value of a sample point within the reference image to the reference sample, wherein the sample point has a first coordinate the same as the reference sample and a second coordinate next a border along the second dimension of the reference image.

5. A panoramic video decoding method based on multi-mode boundary fill, comprising:

entropy decoding, inverse quantizing, and inverse transforming an encoded stream to obtain a reconstructed residual block;

obtaining a predicted image block of a current image block by inter-frame prediction, wherein the inter-frame prediction comprises a boundary fill step, comprising:

using a boundary fill method recorded in a sequence header or an image header of the encoded stream to obtain a sample value of the reference sample, wherein the boundary fill method comprises a cyclic fill method for filling a horizontal image boundary or a vertical image boundary according to coordinates of the reference sample, wherein the cyclic fill method includes:

identifying a reference sample having a first coordinate within the reference image and a second coordinate outside of the reference image, wherein the reference image has a first dimension along direction of the first coordinate and a second dimension along direction of the second coordinate; and assigning a sample value of a sample point within the reference image to the reference sample, wherein the sample point has a first coordinate the same as the reference sample and a second coordinate determined by a modulo operation of the second coordinate of the reference sample based on the second dimension of the reference image; and adding the predicted image block to the reconstructed residual block to obtain a reconstructed image block.

6. The method of claim 5, wherein when the boundary fill method is recorded in the sequence header of the encoded stream, the recorded boundary fill method is adopted for the image of all sequences in the encoded stream, wherein when the boundary fill method is recorded in the image header of the encoded stream, the recorded boundary fill method is adopted for the image corresponding to the image header.

* * * * *